US008811281B2

(12) United States Patent
Leung et al.

(10) Patent No.: US 8,811,281 B2
(45) Date of Patent: Aug. 19, 2014

(54) SOFT RETENTION FOR CALL ADMISSION CONTROL IN COMMUNICATION NETWORKS

(75) Inventors: Kent K. Leung, Los Altos, CA (US); Biswaranjan Panda, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 405 days.

(21) Appl. No.: 13/078,121

(22) Filed: Apr. 1, 2011

(65) Prior Publication Data

US 2012/0250509 A1 Oct. 4, 2012

(51) Int. Cl.
H04W 4/00 (2009.01)
H04W 28/02 (2009.01)
H04W 28/08 (2009.01)

(52) U.S. Cl.
CPC .......... *H04W 28/0252* (2013.01); *H04W 28/08* (2013.01)
USPC ............ 370/328; 370/400; 370/468; 455/450

(58) Field of Classification Search
None
See application file for complete search history.

(56) References Cited

U.S. PATENT DOCUMENTS

| 5,193,151 | A | 3/1993 | Jain |
| 5,497,375 | A | 3/1996 | Hluchyj et al. |
| 6,005,852 | A | 12/1999 | Kokko et al. |
| 6,076,181 | A | 6/2000 | Cheng |
| 6,222,825 | B1 | 4/2001 | Mangin et al. |
| 6,286,052 | B1 | 9/2001 | McCloghrie et al. |
| 6,421,718 | B1 | 7/2002 | Lamkin et al. |
| 6,487,218 | B1 | 11/2002 | Ludwig et al. |
| 6,522,880 | B1 | 2/2003 | Verma et al. |
| 6,539,483 | B1 | 3/2003 | Harrison et al. |
| 6,577,644 | B1 | 6/2003 | Chuah et al. |

(Continued)

FOREIGN PATENT DOCUMENTS

| CA | 2359040 A1 | 3/2002 |
| CA | 2359508 A1 | 5/2002 |

(Continued)

OTHER PUBLICATIONS

"All-IP Core Network Multimedia Domain, Service Based Bearer Control—Tx Interface Stage-3," 3GPP2 X.S0013-013-0, Version 1.0, Dec. 2007. Available at http://www.3gpp2.org/Public_html/specs/X.S0013-013-0_v1.0_080224.pdf. 63 pages.

(Continued)

*Primary Examiner* — Bob Phunkulh
(74) *Attorney, Agent, or Firm* — Wilmer Cutler Pickering Hale and Dorr LLP

(57) ABSTRACT

Systems and methods are disclosed for receiving a request at a packet gateway to allocate a new bearer for a mobile device on a wireless telecommunications network; identifying, at the packet gateway, existing bearers that have a quality of service (QoS) that can be reduced without dropping the existing bearers; reducing, at the packet gateway, the QoS of the existing bearers; reclaiming resources at the packet gateway that were previously in use by the existing bearers; and allocating the new bearer for the mobile device using the reclaimed resources at the packet gateway without causing any of the existing bearers to be disconnected, wherein the existing bearers have a lower priority than the new bearer, and wherein the existing bearers have previously been designated as capable of being preempted.

19 Claims, 5 Drawing Sheets

(56) References Cited

U.S. PATENT DOCUMENTS

| | | | |
|---|---|---|---|
| 6,628,671 B1 | 9/2003 | Dynarski et al. | |
| 6,678,835 B1 | 1/2004 | Shah et al. | |
| 6,747,955 B1 | 6/2004 | Archer | |
| 6,769,000 B1 | 7/2004 | Akhtar et al. | |
| 6,791,945 B1 | 9/2004 | Levenson et al. | |
| 6,810,263 B1 | 10/2004 | Cheng et al. | |
| 6,847,609 B1 | 1/2005 | Sarnikowski et al. | |
| 6,862,268 B2 | 3/2005 | Tripathi et al. | |
| 6,904,033 B1 | 6/2005 | Perras et al. | |
| 6,937,560 B2 * | 8/2005 | Enns et al. | 370/229 |
| 6,954,790 B2 | 10/2005 | Forslow | |
| 6,959,190 B2 | 10/2005 | Choi et al. | |
| 6,963,582 B1 | 11/2005 | Xu | |
| 6,973,309 B1 | 12/2005 | Rygula et al. | |
| 6,985,464 B2 | 1/2006 | Harper et al. | |
| 6,990,088 B2 | 1/2006 | Madour et al. | |
| 6,993,352 B2 | 1/2006 | Lundby | |
| 7,046,680 B1 | 5/2006 | McDysan et al. | |
| 7,058,031 B2 | 6/2006 | Bender et al. | |
| 7,068,669 B2 | 6/2006 | Abrol et al. | |
| 7,130,625 B2 | 10/2006 | Akgun et al. | |
| 7,154,868 B1 | 12/2006 | Sharma et al. | |
| 7,212,537 B2 | 5/2007 | Wybenga et al. | |
| 7,239,636 B2 | 7/2007 | Kadambi et al. | |
| 7,372,826 B2 | 5/2008 | Dahod et al. | |
| 7,406,057 B2 | 7/2008 | Isomaki et al. | |
| 7,441,269 B2 | 10/2008 | Jones et al. | |
| 7,493,084 B2 | 2/2009 | Meier et al. | |
| 7,502,615 B2 | 3/2009 | Wilhoite et al. | |
| 7,660,584 B2 | 2/2010 | Maxwell et al. | |
| 7,859,998 B2 * | 12/2010 | Wade et al. | 370/230 |
| 7,916,642 B2 | 3/2011 | Chowdury et al. | |
| 8,031,671 B2 | 10/2011 | Harper et al. | |
| 2002/0027977 A1 | 3/2002 | Noguchi | |
| 2002/0045450 A1 | 4/2002 | Shimizu et al. | |
| 2002/0057658 A1 | 5/2002 | Lim | |
| 2002/0057663 A1 | 5/2002 | Lim | |
| 2002/0087723 A1 | 7/2002 | Williams et al. | |
| 2002/0091819 A1 | 7/2002 | Melchione et al. | |
| 2002/0141345 A1 * | 10/2002 | Szviatovszki et al. | 370/238 |
| 2002/0147828 A1 | 10/2002 | Chen et al. | |
| 2002/0154627 A1 | 10/2002 | Abrol et al. | |
| 2002/0184374 A1 | 12/2002 | Morikawa | |
| 2002/0196743 A1 | 12/2002 | Thalanany et al. | |
| 2003/0012205 A1 | 1/2003 | Foti et al. | |
| 2003/0021252 A1 | 1/2003 | Harper et al. | |
| 2003/0021283 A1 | 1/2003 | See et al. | |
| 2003/0027595 A1 | 2/2003 | Ejzak | |
| 2003/0053429 A1 | 3/2003 | Choi et al. | |
| 2003/0054823 A1 | 3/2003 | Choi et al. | |
| 2003/0063584 A1 | 4/2003 | Sayeedi | |
| 2003/0078050 A1 | 4/2003 | Carlborg et al. | |
| 2003/0099213 A1 | 5/2003 | Lee et al. | |
| 2003/0119452 A1 | 6/2003 | Kim et al. | |
| 2003/0157927 A1 | 8/2003 | Yi et al. | |
| 2003/0158959 A1 | 8/2003 | Jayapalan et al. | |
| 2003/0158967 A1 | 8/2003 | Tripathi et al. | |
| 2003/0171117 A1 | 9/2003 | Wang et al. | |
| 2003/0204599 A1 | 10/2003 | Trossen et al. | |
| 2004/0008645 A1 | 1/2004 | Janevski et al. | |
| 2004/0008649 A1 | 1/2004 | Wybenga et al. | |
| 2004/0018841 A1 | 1/2004 | Trossen | |
| 2004/0022208 A1 | 2/2004 | Dahod et al. | |
| 2004/0090937 A1 | 5/2004 | Chaskar et al. | |
| 2004/0097232 A1 | 5/2004 | Haverinen | |
| 2004/0125792 A1 | 7/2004 | Bradbury et al. | |
| 2004/0131072 A1 | 7/2004 | Khan et al. | |
| 2004/0215753 A1 | 10/2004 | Chan et al. | |
| 2004/0218564 A1 | 11/2004 | Henrikson | |
| 2004/0250159 A1 | 12/2004 | Tober et al. | |
| 2004/0264377 A1 | 12/2004 | Kilkki et al. | |
| 2005/0025132 A1 | 2/2005 | Harper et al. | |
| 2005/0053034 A1 | 3/2005 | Chiueh | |
| 2005/0059400 A1 | 3/2005 | Jagadeesan et al. | |
| 2005/0094668 A1 | 5/2005 | Hanif et al. | |
| 2005/0117546 A1 | 6/2005 | Lioy et al. | |
| 2005/0135375 A1 | 6/2005 | Hurtta et al. | |
| 2005/0153697 A1 | 7/2005 | Patel | |
| 2005/0198337 A1 | 9/2005 | Sun et al. | |
| 2005/0204043 A1 | 9/2005 | Harper et al. | |
| 2005/0220069 A1 | 10/2005 | Li et al. | |
| 2005/0226154 A1 | 10/2005 | Julka et al. | |
| 2005/0232225 A1 | 10/2005 | Pelaez et al. | |
| 2005/0259664 A1 * | 11/2005 | Vasseur et al. | 370/395.52 |
| 2005/0265360 A1 | 12/2005 | Kim et al. | |
| 2006/0018280 A1 | 1/2006 | Kumar et al. | |
| 2006/0034229 A1 | 2/2006 | Joo et al. | |
| 2006/0058032 A1 | 3/2006 | Pearce et al. | |
| 2006/0062238 A1 | 3/2006 | Mahendran et al. | |
| 2006/0104347 A1 | 5/2006 | Callan et al. | |
| 2006/0105770 A1 | 5/2006 | Jagadeesan et al. | |
| 2006/0114855 A1 | 6/2006 | Zheng | |
| 2006/0126509 A1 | 6/2006 | Abi-Nassif et al. | |
| 2006/0126564 A1 | 6/2006 | Ramanna et al. | |
| 2006/0183472 A1 | 8/2006 | Nookala et al. | |
| 2006/0198508 A1 | 9/2006 | Delaney et al. | |
| 2006/0203773 A1 | 9/2006 | Georges et al. | |
| 2006/0205407 A1 | 9/2006 | Jagadeesan et al. | |
| 2006/0221825 A1 | 10/2006 | Okano | |
| 2006/0245395 A1 | 11/2006 | Jain et al. | |
| 2006/0271693 A1 | 11/2006 | Thiebaut et al. | |
| 2006/0285519 A1 | 12/2006 | Narayanan et al. | |
| 2006/0291412 A1 | 12/2006 | Naqvi et al. | |
| 2006/0291489 A1 | 12/2006 | Naqvi et al. | |
| 2007/0123259 A1 | 5/2007 | Huang et al. | |
| 2007/0140220 A1 | 6/2007 | Doradla et al. | |
| 2007/0140299 A1 | 6/2007 | Hofmann et al. | |
| 2007/0189255 A1 | 8/2007 | Navali et al. | |
| 2007/0211726 A1 | 9/2007 | Kuang et al. | |
| 2007/0226775 A1 | 9/2007 | Andreasen et al. | |
| 2007/0253371 A1 | 11/2007 | Harper et al. | |
| 2007/0254661 A1 | 11/2007 | Chowdhury et al. | |
| 2008/0146230 A1 | 6/2008 | Pandian et al. | |
| 2008/0155659 A1 | 6/2008 | Gazier et al. | |
| 2008/0175200 A1 | 7/2008 | Stammers et al. | |
| 2008/0192632 A1 * | 8/2008 | Bader | 370/230.1 |
| 2008/0192674 A1 | 8/2008 | Wang et al. | |
| 2008/0205342 A1 | 8/2008 | Radhakrishnan et al. | |
| 2008/0256251 A1 | 10/2008 | Huotari et al. | |
| 2008/0313306 A1 | 12/2008 | Skog | |
| 2008/0320149 A1 | 12/2008 | Faccin | |
| 2009/0086742 A1 | 4/2009 | Ghai et al. | |
| 2009/0141625 A1 | 6/2009 | Ghai et al. | |
| 2009/0156213 A1 | 6/2009 | Spinelli et al. | |
| 2009/0203394 A1 | 8/2009 | Shaffer et al. | |
| 2010/0040047 A1 | 2/2010 | Castellanos Zamora et al. | |
| 2010/0098021 A1 | 4/2010 | Stammers et al. | |
| 2010/0232353 A1 | 9/2010 | Hu et al. | |
| 2011/0039589 A1 * | 2/2011 | Skov | 455/501 |
| 2011/0305137 A1 * | 12/2011 | Chu et al. | 370/230 |

FOREIGN PATENT DOCUMENTS

| | | |
|---|---|---|
| CN | 1422065 A | 6/2003 |
| CN | 1596023 A | 3/2005 |
| EP | 0415843 | 3/1991 |
| EP | 1 435 748 B1 | 3/2006 |
| JP | 09-083775 A | 3/1997 |
| JP | 2003070043 A | 3/2003 |
| JP | 2004515986 A | 5/2004 |
| JP | 2005229583 A | 8/2005 |
| JP | 2006092242 A | 4/2006 |
| JP | 2006042001 A | 2/2009 |
| WO | WO-0054523 A1 | 9/2000 |
| WO | WO-03001725 A1 | 1/2003 |
| WO | WO-03001762 A2 | 1/2003 |
| WO | WO-03030483 A1 | 4/2003 |
| WO | WO-03071765 A1 | 8/2003 |
| WO | WO-2004004378 A1 | 1/2004 |
| WO | WO-2004036849 A2 | 4/2004 |
| WO | WO-2004071104 A2 | 8/2004 |
| WO | WO-2005010708 A2 | 2/2005 |

(56) References Cited

FOREIGN PATENT DOCUMENTS

| WO | WO-2005051026 A1 | 6/2005 |
|---|---|---|
| WO | WO-2006052487 A2 | 5/2006 |
| WO | WO-2007090463 A1 | 8/2007 |

OTHER PUBLICATIONS

3GPP TS 23.203 V7.3.0 (Jun. 2007), 3rd Generation Partnership Project; Technical Specification Group Services and System Aspects; Policy and charging control architecture (Release 7), Global System for Mobile Communications (GSM), http://www.3gpp.org/ftp/Specs/html-info/23203.htm (Additional versions of the document are available at this link). 72 pages.

3GPP TS 29.214 V7.1.0 (Jun. 2007), 3rd Generation Partnership Project; Techincal Specification Group Core Network and Terminals; Policy and Charging Control over Rx reference point (Release 7), Global System for Mobile Communications (GSM), http://www.3gpp.org/ftp/Specs/html-info/29214.htm (additional versions of the specification are available at this link). 34 pages.

3GPP2—WLAN Interworking, 3rd Generation Partnership Project 2 "3GPP2", 3GPP2 S.R0087-0, Version 1.0, Version Date: Jul. 22, 2004. 19 pages.

3GPP2 Access Network Interfaces Interoperability Specification, Revision A. (Jun. 2001). $3^{rd}$ Generation Partnership Project 2 "3GPP2", http://www.3gpp2.org/public_html/specs/A.S0001-A_v2.0.pdf. pp. 173-193. 22 pages.

First Office Action issued by the Chinese Patent Office for corresponding Chinese Patent Application No. 200480042815.0 (with English translation). Dated Apr. 4, 2008. 13 pages.

Fourth Amended Complaint, *UTSTARCOM, Inc.*, vs. *Starent Networks, Corp., et al.*, in the United States District Court for the Northern District of Illinois Eastern Division, Case 1:07-cv-02582, Document 207, Filed Sep. 25, 2008, pp. 1, 47, 69 and 91. 4 pages.

International Search Report and Written Opinion for International Patent Application No. PCT/US2007/003566. Mailed on Oct. 29, 2007. 3 pages.

International Search Report and Written Opinion issued for corresponding International Patent Application No. PCT/US2008/053464. Mailed on Jul. 17, 2008. 6 pages.

International Search Report and Written Opinion issued for corresponding International Patent Application No. PCT/US2008/069328. Mailed on Sep. 3, 2008. 6 pages.

U.S. Appl. No. 60/758,343, filed Jan. 11, 2006. 18 pages.

U.S. Appl. No. 61/230,031, filed Jul. 30, 2009. 8 pages.

Fourth Amended Complaint, *UTSTARCOM, Inc.*, v. *Starent Networks, Corp., et al.*, in the United States District Court for the Northern District of Illinois Eastern Division, Case 1:07-cv02582, Document 207, Filed Sep. 25, 2008, pp. 1, 48, 70 and 91. 4 pages.

International Search Report issued for International Patent Application No. PCT/US2006/031392. Mailed on Apr. 30, 2007. 3 pages.

Perkins, C., "IP Mobility Support," Network Working Group, Request for Comments: 2002, Category: Standard Track, Oct. 1996, http://www.ietf.org/rfc/rfc2002.txt?number=2002. 68 pages.

Rosenberg, J. et al., Reliability of Provisional Responses in the Session Initiation Protocol (SIP), The Internet Society, http://www.ietf.org/rfc/rfc3262.txt, Jun. 2002. 14 pages.

Supplemental EP Search Report issued for EP047787121.2 (PCT/US2004/023338), Dated May 11, 2010. 3 pages.

Supplementary European Search Report mailed by European Patent Office on Feb. 26, 2010 for corresponding European Patent Application No. 06801267.3. 8 pages.

\* cited by examiner

SOFT RETENTION FOR CALL ADMISSION CONTROL IN COMMUNICATION NETWORKS

TECHNICAL FIELD

The present disclosure relates generally to providing methods for call retention in communication networks.

BACKGROUND

The present disclosure relates to wireless telephone systems. The first generation of wireless telephone technology used analog mobile phones in which analog information signals were transmitted. As technology has progressed, 2 G, 2.5 G and 3 G systems have developed to handle higher-speed digital packet data, using wireless standards developed by industry consortiums such as the 3rd Generation Partnership Project (3 GPP) and the 3rd Generation Partnership Project 2 (3 GPP2). The next generation of wireless technology is referred to as 4 G technology, based on a standard known as long term evolution-system architecture evolution (LTE SAE) that uses orthogonal frequency division multiple access (OFDMA) technology. LTE networks consist of an evolved universal terrestrial radio access network (EUTRAN), an evolved packet core (EPC) network, and a packet network that hosts applications, which may be an IP multimedia subsystem (IMS) network.

In 3 GPP EPC networks, telephone handsets connect to packet gateways and establish bearers to access network resources, such as voice calls. Mechanisms exist in 3 GPP that allow preemption of existing bearers to allow access to new bearers. This mechanism, referred to as hard retention, allows a packet gateway to grant access to certain bearers even while in a resource-limited situation. However, allowing access to new bearers can cause existing bearers to get disconnected, leading to customers experiencing "dropped calls."

DESCRIPTION OF EXAMPLE EMBODIMENTS

Overview

Figure 1:
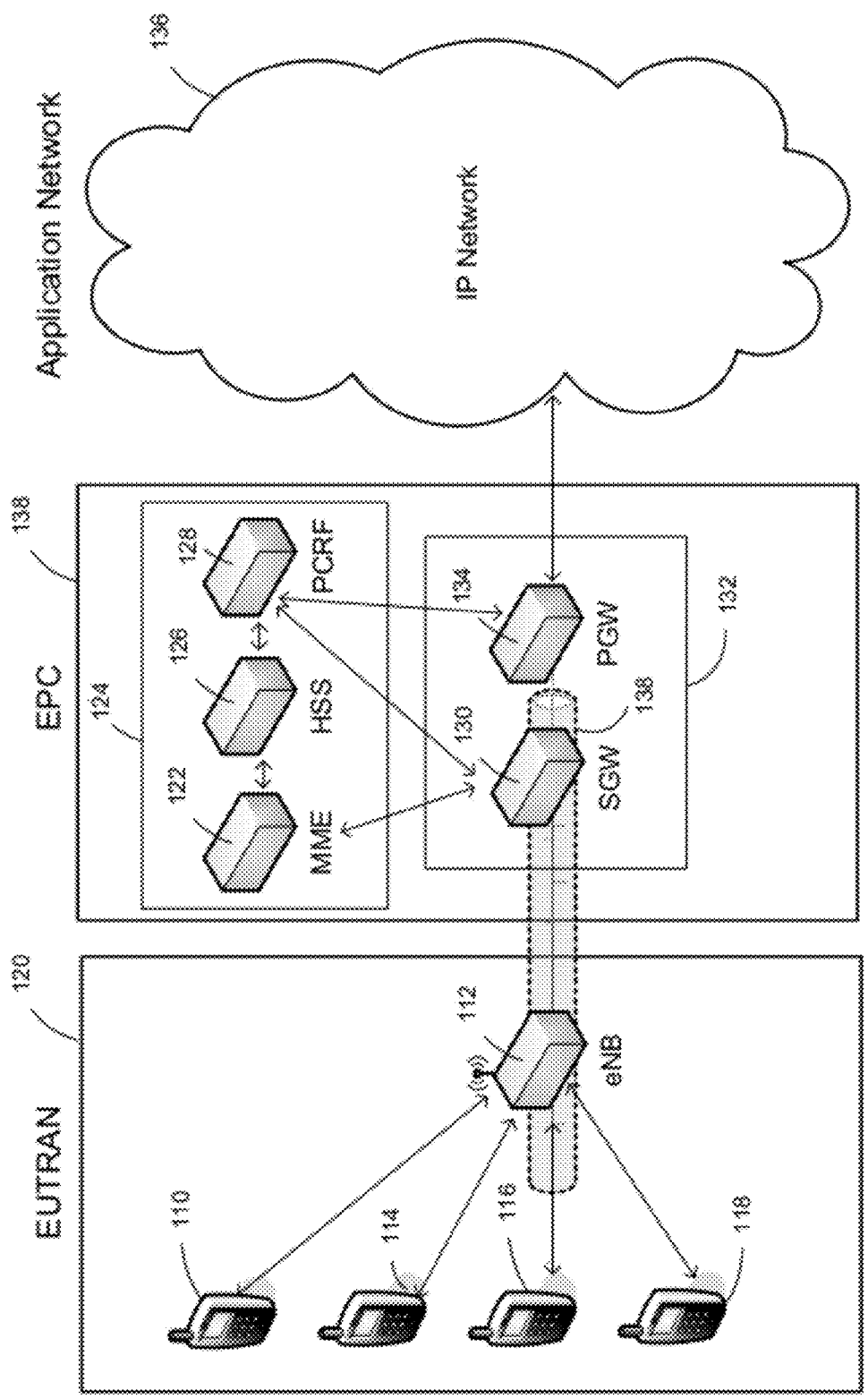
FIG. 1 is a schematic representation of an Evolved Packet Core (EPC) wireless data network in accordance with certain embodiments.

Systems and methods are disclosed for receiving a request at a packet gateway to allocate a new bearer for a mobile device on a wireless telecommunications network; identifying, at the packet gateway, one or more existing bearers that have a quality of service (QoS) that can be reduced without dropping the existing bearers; reducing, at the packet gateway, the QoS of the existing bearers; reclaiming resources at the packet gateway that were previously in use by the existing bearers; and allocating the new bearer for the mobile device using the reclaimed resources at the packet gateway without causing any of the existing bearers to be disconnected, wherein the existing bearers have a lower priority than the new bearer, and wherein the existing bearers have previously been designated as capable of being preempted.

Example Embodiments

An evolved packet core (EPC) network may include one or more cellular telephones or other mobile devices, called user equipment (UE); a radio transceiver/base station, called an eNodeB; a control node, called a mobile management entity (MME), which is responsible for tracking and paging the UE, as well as for selecting the serving gateway; a serving gateway (SGW), which routes and forwards user data packets and serves as a mobility anchor for the UE; and a packet data network gateway (PDN gateway), which provides connectivity for the UE to external packet data networks and performs policy enforcement and charging. As well, other network nodes, such as a home subscriber server/authentication, authorization and accounting server (HSS/AAA server) and a policy charging and rules function (PCRF) server, may serve additional functions. Through the PDN GW, the EPC connects to applications such as voice telephony or public Internet data service, which may reside on an IP Multimedia Subsystem (IMS) network or on another IP network. Although an EPC network with EPS bearers and PDN gateways is described below, a similar method may be used to permit soft retention of bearers on other network technologies, particularly network technologies that use IP tunnels with a specified QoS and bandwidth, such as PDP contexts in GPRS networks. Such other networks can also include base stations and gateways and have a core network, and may specifically include 3 G networks.

Quality of Service (QoS) is often implemented on wireless networks. Quality of service relates to the ability to provide different priority to different applications, users, or data flows, or to guarantee a certain level of performance to a data flow. For example, a required bit rate, delay, jitter, packet dropping probability, and/or bit error rate may be guaranteed. Quality of service guarantees can be important if the network capacity is insufficient, especially for real-time streaming multimedia applications such as Voice-over-IP (VoIP), online games, and IP-TV, since these applications often require fixed bit rate and are delay sensitive, and in networks in which capacity is a limited resource, for example, in cellular data communication.

The evolved packet core may use a EUTRAN to provide its physical layer. EUTRAN stands for the Evolved Universal Terrestrial Radio Access Network. The underlying air interface uses orthogonal frequency division multiple access (OFDMA) technology to provide higher data rates and lower latency, and is optimized for packetized data traffic. User equipment (UE) attaches to an evolved NodeB (eNodeB) to access the network. In doing so, the UE requests radio resources from the eNodeB to establish a radio bearer. Once the radio bearer is established, the UE initiates a request for an EPS bearer.

An EPS bearer is part of a point-to-point virtual data connection from the UE to destinations on one or more packet data networks (PDNs). The EPS bearer resides in the end-to-end connection between the UE and the remote IP endpoint. The UE first connects to the eNodeB via a radio access bearer; the eNodeB then establishes an EPS bearer to the PDN gateway; finally, the PDN gateway establishes an external IP tunnel or connection to the desired resource on the IP network. Multiple bearers may be established by a single UE.

An EPS bearer is characterized by its two endpoints, and also by per-bearer quality of service (QoS) information. This information is used by the PDN gateway and upstream network nodes to effectively prioritize packet flows over the specified EPS bearer. EPS bearers may be associated with a QoS class identifier (QCI) and an allocation and retention priority (ARP) parameter. If the EPS bearer has a quality of service that is higher than best effort (a QoS level that is considered low), the bearer may also be associated with parameters that disclose a guaranteed bit rate (GBR) and a maximum bit rate (MBR).

FIG. 1 is a schematic diagram of network nodes in an Evolved Packet Core network. In FIG. 1, UE 110 is connected to eNodeB 112 via a radio bearer. The eNodeB 112 is also connected to UEs 114, 116 and 118 via their own radio bearers. The UEs and eNodeB 112 together form Evolved Universal Terrestrial Radio Access Network (EUTRAN) 120. ENodeB 112 is connected to a Mobile Management Entity (MME) 122, which is part of an EPC Control Plane 124, together with a Home Subscriber Server 126 and Policy Control Rules Function (PCRF) 128. The nodes 122, 126 and 128 that form the control plane 124 perform management functions for the UEs connected to the network. Management signaling between UE 110 and network nodes, primarily with MME 122, passes through the control plane and is separate from regular packet data traffic.

ENodeB 112 is also connected to a Serving Gateway (SGW) 130, which is part of EPC data plane 132, together with a Packet Gateway (PGW) 134. SGW 130 provides mobility management for UE 110, while PGW 134 provides access to packet data network (PDN) 136. Regular packet data traffic between UE 110 and PDN 136 travels over the data plane, without passing through the control plane. Although SGW 130 and PGW 134 are part of the data plane, they communicate with MME 122 and other nodes in the control plane. Together, the control plane and the data plane form an evolved packet core (EPC) 138. Applications such as Voice-over-IP (VoIP) voice and video calling, and email and World Wide Web (WWW) services (not shown), can be accessed via PDN 136. UE 110 communicates with PGW 136 over an IP tunnel 140, which consists of a radio access bearer between UE 110 and eNodeB 112 and an EPS bearer between eNodeB 112 and PGW 134. PGW 134 and PDN 136 may communicate over an IP tunnel or via an ordinary IP traffic flow.

In some embodiments, bearer activation occurs as follows. UE 110 connects to eNodeB 112 and sends a UE Attach request. ENodeB 112 provisions a radio access bearer and forwards the Attach request to MME 122. MME 122 selects SGW 130 as the mobility anchor for UE 110, and also requests access to packet data network 136 to PDN gateway 124. PDN gateway 124 subsequently establishes an EPS bearer connecting PDN gateway 124 to eNodeB 112, and an external bearer to IP network 136. An end-to-end bearer 138 is thus formed between UE 110 and PDN 112.

Call admission control is the procedure for determining whether a new bearer can attach to a PDN gateway. When an eNodeB requests setup of an EPS bearer at a PDN gateway, the PDN gateway must assess whether it has the capability to provide service over a new bearer. To make the assessment, the PDN gateway evaluates various load and congestion characteristics, which may include the amount of bandwidth currently in use at the PDN gateway, CPU load, number of active bearers, sessions or PDP sessions, and memory usage. Various methods for handling high load at a PDN gateway may be used, such as load balancing, dropping existing PDP sessions or EPS bearers, or refusing to accept new EPS bearers.

Each EPS bearer includes three ARP parameters: a scalar priority level (PL), a preemption capability flag (PC), and a preemption vulnerability flag (PV). These three parameters are interpreted together to allow the PDN gateway to assess whether a new bearer should be given a higher or lower priority over existing bearers. A bearer with the PC flag set is designated as a bearer that can preempt other bearers during call admission control. A bearer with the PV flag set is designated as a bearer that can be preempted by other bearers during call admission control. In this way, the PC and PV flags effectively designate some bearers as higher priority and others as lower priority. The priority level itself is a scalar (number), with 1 being the highest priority, and higher numbers associated with lower priority. Typically, three ARP priority level ranges may be defined, corresponding to high, medium and low priority. ARP parameters are used for both radio access bearer establishment and EPS bearer establishment, and are used to negotiate conflicts for radio resources, data resources, and bandwidth.

Additional quality of service control may be enabled using a QoS Class Identifier (QCI) and guaranteed bit rate/maximum bit rate (GBR/MBR) parameters. QCI is an index referring to a number of different sets of minimum QoS characteristics required by a particular service. There are 9 standardized QCIs and example services, which are described in 3 GPP TS 23.401, and which include conversational video, streaming video, regular TCP traffic, voice traffic, and other classes of traffic that each have latency, minimum bandwidth, and priority requirements. QCI is used to control bearer-level packet forwarding treatment, such as scheduling weights, admission thresholds, queue management thresholds, or link layer protocol configuration. QCI values may be pre-configured by the operator at the eNodeB.

Each bearer may have a QCI value, which is used by routers in the EPC and in remote/upstream IP networks to deliver service at an appropriate quality of service. QCI values may be mapped to Differentiated Services values, providing a corresponding DiffServ code point (DSCP) for each QCI class of service that can be used in conjunction with networks that support the Differentiated Services Architecture for providing QoS. While QCI values are recognized primarily by 3 GPP network hosts, DSCP values are generally recognized by general IP network routers and gateways throughout the Internet, and thus provide network-level QoS when upstream from the PDN gateway and in the target packet data network.

In 3 GPP EPC, ARP parameters are used for call admission control. When a high priority incoming call arrives at a PDN gateway that is congested and unable to allocate unused bandwidth to the incoming call, one or more established calls with lower priority retention value may be dropped to allow the new call to be set up. Call admission control methods where new bearers are refused or new bearers are accepted by dropping existing bearers are known as hard retention or binary retention.

Such hard retention is currently supported by 3 GPP using the ARP parameters of the EPS bearer. According to 3 GPP TS 23.401, "The primary purpose of ARP is to decide whether a bearer establishment/modification request can be accepted or needs to be rejected due to resource limitations (typically available radio capacity for GBR bearers). The priority level information of the ARP is used for this decision to ensure that the request of the bearer with the higher priority level is preferred. In addition, the ARP can be used (e.g. by the eNodeB) to decide which bearer(s) to drop during exceptional resource limitations (e.g. at handover). The pre-emption capability information of the ARP defines whether a bearer with a lower ARP priority level should be dropped to free up the required resources. The preemption vulnerability information of the ARP defines whether a bearer is applicable for such dropping by a pre-emption capable bearer with a higher ARP priority value."

An example of hard retention is as follows. A request to establish a new EPS bearer is received by a PDN gateway, with the highest priority, priority 1, and with the PC flag set. The PDN gateway first determines that it is heavily loaded, and cannot set up the new EPS bearer without adversely impacting other bearers. The PDN gateway then notes that the PC flag is set and that the request has a high priority, and searches for existing bearers that have both the PV flag set and a lower priority than the new bearer request. If sufficient resources can be freed up at the PDN gateway by dropping existing bearers, the PDN gateway drops existing bearers as necessary to accept the new bearer request.

Although hard retention is intended to provide a PDN gateway the capacity to accept new bearers, it has the undesirable tradeoff of causing dropped calls. As maintaining existing calls is desirable to a mobile operator, it is also desirable for mobile operators to have an alternative retention scheme that avoids this problem. In some situations, it may be desirable for one or more lower priority calls to experience reduced service while sufficient resources are reclaimed to accept the new call. This reduced service to one or more calls may be implemented by reducing the QoS or bandwidth requirements of lower priority calls to obtain the required resources for the new call. This process is referred to as "soft retention," as it provides an intermediate level of retention between "connected at full data rate" and "disconnected."

Soft retention may be provided in conjunction with a mechanism for reducing load at the PDN gateway in some embodiments. In particular, congestion at a PDN gateway can lead to insufficient bandwidth for providing packet delivery services to a UE. A soft retention method may intelligently reduce bandwidth used by bearers that are already connected in order to provision the new bearer. Reducing the bandwidth used by the existing bearers may result in reducing the quality of service provided to the existing bearers. Therefore, it is appropriate to evaluate quality of service parameters associated with the existing and new bearers when evaluating or performing soft retention.

EPS Bearer QoS also includes parameters for defining guaranteed bit rate (GBR) and minimum bit rate (MBR) for a given bearer. When GBR and MBR parameters exist, the bandwidth for existing bearers can be reduced or deallocated based on GBR and MBR requirements. In addition, some bearers may have bandwidth reduced to a minimum acceptable level. This minimum level may be called the "retention bandwidth," and may be configurable for each bearer. A retention bandwidth is similar to the MBR parameter, but is configurable for every bearer, including bearers without MBR parameters, and is maintained, stored and utilized at the PDN gateway. Retention bandwidth may be configured in some embodiments by directly connecting to the PDN gateway via the command line, or via a policy interface, or via any other commonly-known method for supplying configuration information. In some embodiments, retention bandwidth may be lower than the MBR or than the bandwidth specified by the QCI value, and may be set as needed to maintain calls without dropping them.

Various algorithms and heuristics for selecting bearers to be preempted may be used in different embodiments. For example, bearers may be selected for bandwidth reduction and degradation by starting with low priority bearers and selecting bearers in order of increasing priority. Bearers may also be selected in order of decreasing priority, or using a best-fit algorithm that finds the least number of bearers that can be impacted by the bandwidth required for a new bearer. As multiple bearers may be present in a single user session, algorithms may also be provided in some embodiments that impact the fewest user sessions. A given bearer at a given priority level may be downgraded to its retention bandwidth. The downgrade bandwidth may also be configurable by the system and can use different parameters in different embodiments. In selecting bearers and reducing bearer bandwidth, the PDN gateway may take into account the minimum guaranteed bandwidth (GBR) QoS parameter of the bearer or the minimum bandwidth indicated by the QCI value associated with the bearer.

In various embodiments, once a new bearer request is received, the exact amount of bandwidth required can be freed. In other embodiments, additional bandwidth may be freed for future use. In other embodiments, selection of sessions or bearers for downgrading may be based on policy control from a PCRF, or by using deep packet inspection (DPI), type of service, traffic use for the session, or other factors. Certain users may be selected for higher quality of service, so that their bearers could be designated as off-limits for downgrading. Bearers could be prioritized for or protected from downgrading by other criteria in some embodiments, such as based on the target packet data network, on the source eNodeB, on the international mobile equipment identity (IMEI), the geographic location of the UE or the source eNodeB, paid service level, device type, or on other criteria. This information may be retrieved from an authentication, authorization and accounting (AAA) server. An incoming high-priority bearer may cause preemption of only one of multiple bearers of a lower-priority user. When reducing the bandwidth of a targeted bearer, the PDN gateway may partially reduce its bandwidth only as much as required, causing only partial degradation, instead of reducing the bearer to its retention bandwidth.

An example of retention bandwidth with relation to ARP priority level is shown below in Table 1.

TABLE 1

| ARP PL | Retention Bandwidth |
| --- | --- |
| 1 (high) | 50 kbps |
| 2-8 | 25 kbps |
| 9-15 (low) | 10 kbps |

Figure 2:
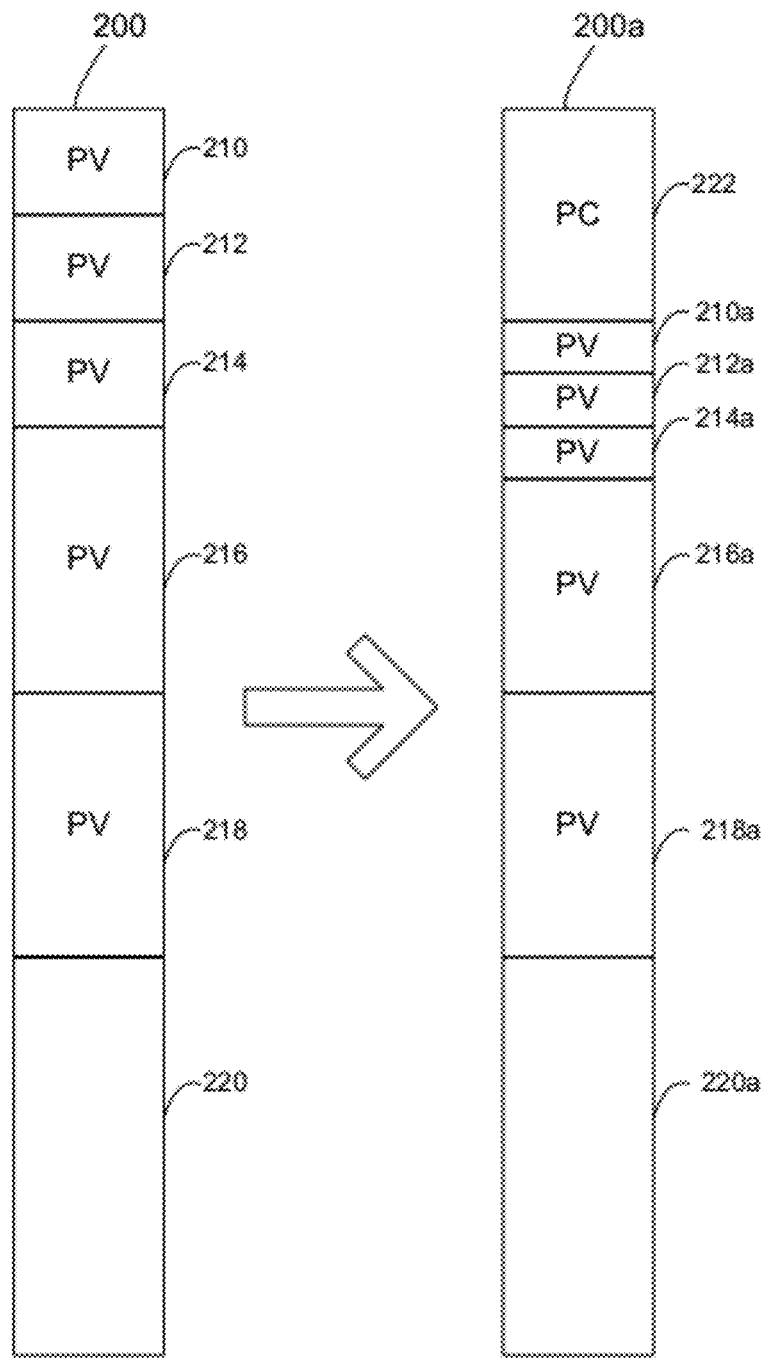
FIG. 2 is a schematic representation of bandwidth required for a plurality of EPS bearers at a packet data network gateway (PGW), in accordance with certain embodiments.

FIG. 2 is a schematic diagram of bandwidth used before and after a call admission request to a PDN gateway (not shown) using a soft retention method in some embodiments. Bar 200 represents the total amount of bandwidth available at the PDN gateway for access to an arbitrary packet data network (not shown). Box 210 represents a low amount of bandwidth allocated to a single bearer with ARP priority level 10, and allocated 20 kbps according to preexisting QoS parameters such as GBR and MBR. Boxes 212 and 214 also reflect low bandwidth bearers with the same 20 kbps allocation, and along with Box 210, are marked "PV" to indicate that their corresponding bearers have the Preemption Vulnerability flag set in their ARP parameters. Boxes 216 and 218 represent medium-priority bearers with ARP priority level 5, allocated 50 kbps and with their PV flags set, and Box 220 represents a high-priority bearer with priority level 1 and allocated 75 kbps, and without the PV flag set. The PDN gateway is configured with retention bandwidth parameters corresponding to Table 1.

When a high-priority call is made by a user and bandwidth is insufficient at the PDN gateway to provide the QoS required by the call, the PDN gateway checks the EPS bearer request ARP parameters to see if the request has its ARP preemption capability (PC) flag set. If the PC flag is set, the PDN gateway may attempt to free up bandwidth by looking for other bearers that have the preemption vulnerability (PV) flag set and that can be preempted. This applies primarily to guaranteed bitrate (GBR) bearers but may apply to non-GBR bearers as well, in some embodiments.

A new call with priority level 2 and with a preemption capability flag set, requiring 40 kbps, is received at the PDN gateway. Using a lowest priority first algorithm for selecting bearers for bandwidth reduction, the PDN gateway will free up 10 kbps from each of the 3 calls with priority level 10, and will also free up 10 kbps from one of the two calls with priority level 5, for a total of 40 kbps. A total of 4 calls are impacted, with 3 calls reduced to the retention bandwidth limit. In some embodiments, selection of sessions for bandwidth reduction may be based on limiting the number of impacted sessions. If multiple sessions in the configured range exist, a selection logic for finding the minimum number of sessions to match the required bandwidth of the new call as closely as possible may be used.

Bar 200*a* represents the total amount of bandwidth available at the PDN gateway after the new bearer with preemption capability is requested and allocated. Note that the total bandwidth handled by the PDN gateway has not changed from bar 200 to bar 200*a*. The bandwidth used by the new bearer is 40 kbps, represented by box 222. The new bearer also has the Preemption Capability flag set, as indicated by the notation in box 222. To accommodate box 222, the bandwidth used by existing bearers with preemption vulnerability has been reduced. This is reflected by Boxes 210*a*, 212*a* and 214*a*, which correspond to boxes 210, 212 and 214 and have been reduced by 10 kbps each to their retention bandwidth. Box 216*a* has also been reduced by 10 kbps, but not to its retention bandwidth. Boxes 218*a* and 220*a* have not changed in size. The bearer corresponding to box 216*a* has been selected at random over bearer 218*a* to be downgraded.

Figure 3:
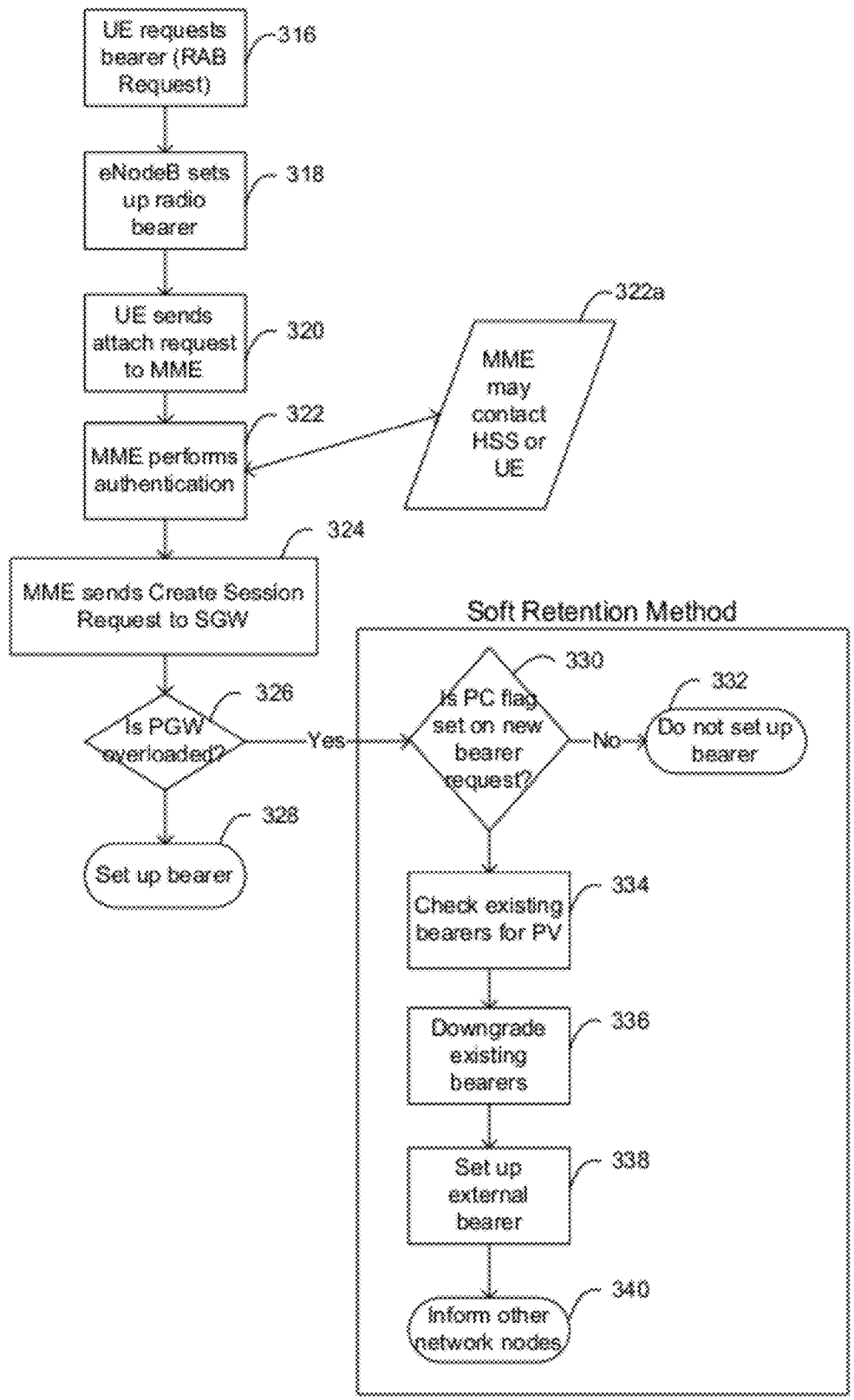
FIG. 3 is a flowchart illustrating soft retention using QoS parameters associated with EPS bearers, in accordance with certain embodiments.

FIG. 3 is a flowchart for a method showing actions for implementing soft retention in some embodiments. At step 316, a UE sends an initial radio resource control (RRC) request to a eNodeB. At step 318, this request is received by the eNodeB, and a RRC connection is set up. This is sent to the UE via a RRC connection setup complete message. At step 320, the UE sends an attach request via the eNodeB to a MME, as part of a network access stratum (NAS) connection establishment message. The MME then performs authentication via an HSS server at step 322. During this stage the MME may request further information from the UE to complete authentication, as seen at step 322*a*. Once the UE is authenticated, the MME selects a SGW and sends the SGW a create session request at step 324. The SGW then contacts the PGW to set up an initial EPS bearer. At step 326, the PGW assesses its load, and if it is capable of providing services without negatively impacting existing bearers, it sets up the requested bearer and notifies the UE using an activate default EPS bearer context request. Additional EPS bearers may be set up if requested and if permitted by PGW load.

However, if at step 326 the PGW is overloaded, or if the PGW is unable to allocate the bandwidth for a new EPS bearer, the PGW attempts to create the new EPS bearer using a soft retention method. At step 330, the PGW checks to see if the preemption capability (PC) flag is set in the activate default EPS bearer context request. If the PC flag is not set, the EPS bearer request is rejected and no new bearer is created, step 332. If the PC flag is set, the PGW then checks to see which existing bearers have their preemption vulnerability (PV) flag set at step 334. Various embodiments may use different algorithms for determining the order of bearers to be checked. At step 336, the PGW may select and downgrade as many existing bearers as necessary to their retention bandwidth to provide bandwidth for satisfying the new EPS bearer request. The downgrade may be completed immediately at the PDN gateway, such that needed bandwidth is relinquished prior to the establishment of the new EPS bearer.

At step 338, the PGW sets up the new EPS bearer and sets up the external bearer or external tunnel to a remote IP network. The PGW then responds to the SGW with a create session response. The SGW then responds to the UE with an activate default EPS bearer context request. When the UE responds with a context accept message, the UE is connected to the external packet data network via an end-to-end bearer, without necessitating a hard disconnection of any existing bearers.

After a bearer has been downgraded at the PDN gateway, the PDN gateway may inform other network nodes throughout the network about the change in bearer bandwidth, as indicated at step 340. This is permitted using a modify bearer request to change the MBR/GBR ARP parameters in some embodiments. For each bearer that has been affected, the PDN gateway informs a MME associated with the bearer via a GTP signaling protocol. This may be done by informing the SGW, which then sends a standard modify bearer request to the MME. The MME may inform the radio access network and eNodeB that the available bandwidth for the bearer has changed. The PDN gateway may also inform, for each bearer that has been modified, a PCRF associated with the bearer via a Gx signaling protocol with congestion notification. The congestion notification may indicate the reason for downgrading the QoS on the call. In some cases the eNodeB may be able to free up radio resources as a result. The PCRF may inform the application function via a Rx signaling protocol that the available bandwidth has changed as well, which may result in, for example, the application switching to a lower-bandwidth codec.

If a large number of bearers has been modified, a large number of messages may be required to inform other network nodes about bearer modifications, which may result in a packet flood or network congestion. In this case, the required signaling would be sent over the control plane, which may have less capacity than the data plane, and which may carry control data for many UEs. Some embodiments may mitigate this effect by choosing to modify fewer bearers. Throttling may also be provided by the PDN gateway to mitigate packet flooding in some embodiments, although the benefits of throttling must be balanced against a delaying of the bearer modification. However, because the modification messages are sent after the resources are relinquished at the PDN gateway, it is not necessary for these bearer modification messages to propagate fully for the new EPS bearer to be established at the PDN gateway and for the new call to be connected.

In some embodiments, the soft retention method may be used in all circumstances. In other embodiments, this method may be used only when the PDN gateway is congested, where congestion may be defined using a system's memory use, CPU load, and for a number of sessions; for example, a low congestion threshold may be defined at 75% load, and high congestion at 88% load. Load may also be evaluated on supported gateways using a dynamic feedback protocol (DFP), which assigns weights to various system load factors to compute an overall load value. Some embodiments may only allow preemption by calls with ARP priority level 1-5 at a high load state, while other embodiments may allow some combination of ARP priority levels at different congestion thresholds. In another embodiment, a similar method is used for both guaranteed bit rate (GBR) and non-GBR bearers. In another embodiment, a similar method may be used when a new EPS bearer is desired subsequent to the initial UE attach sequence. In certain embodiments, the PC flag or the PV flag may be ignored, so that soft retention is always or never performed. As well, when a PDN gateway detects that it is so congested that a soft retention policy will be unable to free up bandwidth for a call, it may revert to hard retention to take high-priority calls, instead of refusing a new high-priority call. This may be useful, for example, when providing emergency services. Emergency services may also be implemented either using hard retention or soft retention QoS policies.

User Equipment and Gateway

The user equipment described above can communicate with a plurality of radio access networks using a plurality of access technologies and with wired communication networks. The user equipment can be a smartphone offering advanced capabilities such as word processing, web browsing, gaming, e-book capabilities, an operating system, and a full keyboard. The user equipment may run an operating system such as Symbian OS, iPhone OS, RIM's Blackberry, Windows Mobile, Linux, HP WebOS, and Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory, such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor, such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The gateway described above is implemented in a network device in some embodiments. This network device can implement multiple and different integrated functionalities. In some embodiments, one or more of the following functionalities can be implemented on the network device, including a security gateway (SeGW), an access gateway, a Gateway General packet radio service Serving Node (GGSN), a serving GPRS support node (SGSN), a packet data inter-working function (PDIF), an access service network gateway (AS-NGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or a home agent (HA). In certain embodiments, the functionalities are provided by a combination of hardware and software in the network device. General purpose hardware can be configured in the network device to provide one or more of these specialized functionalities.

Figure 4:
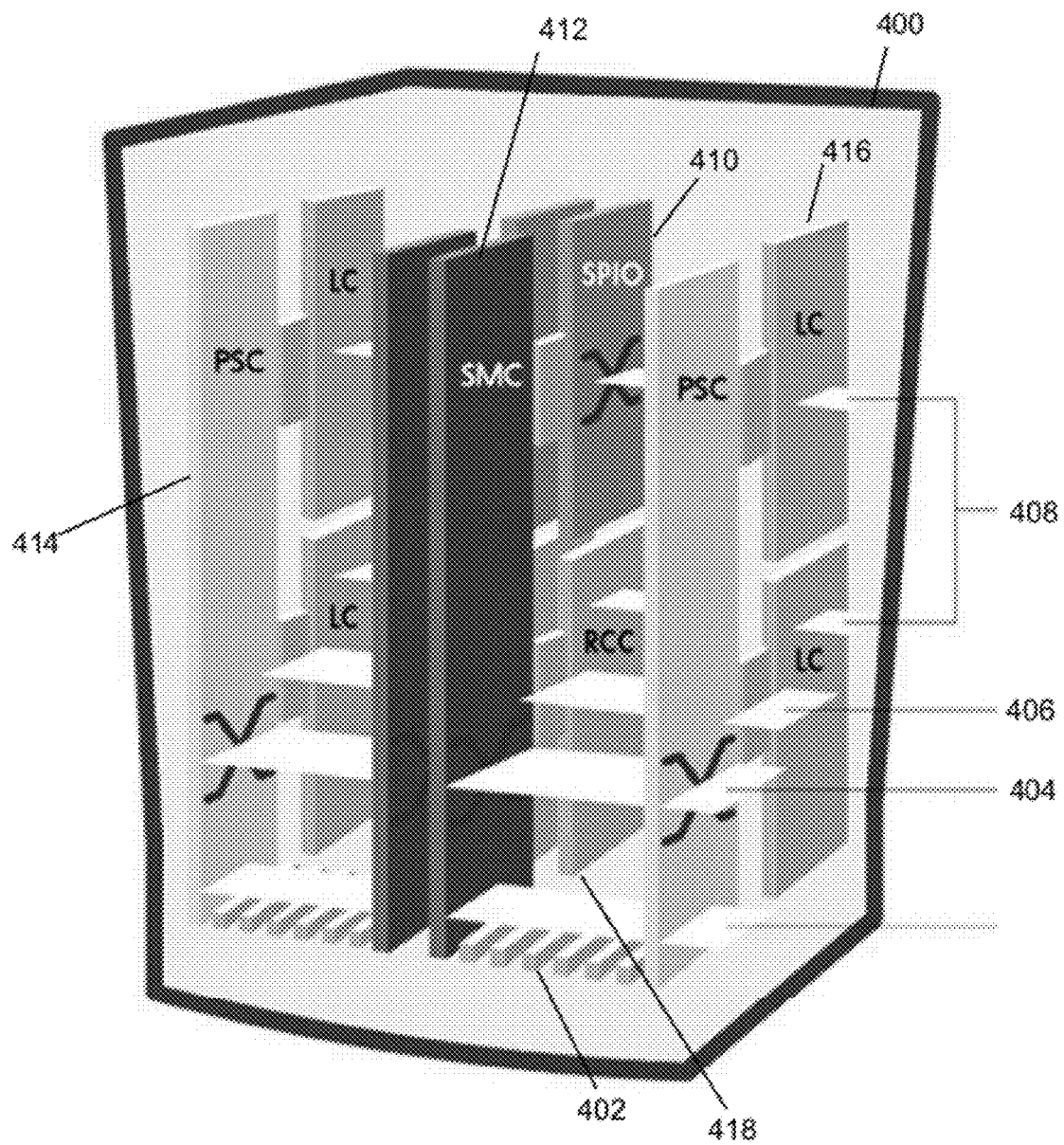
FIGS. 4-5 illustrate a network device in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 4 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplexed (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device may support various types of application cards, including a switch processor I/O card (SPIO) 410, a system management card (SMC) 412, a packet service card (PSC) 414, and a packet accelerator card (not shown). Other cards used in the network device may include line cards 416 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 may provide packet processing, context processing capabilities, and forwarding capabilities. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions, so that if a problem is encountered in one sub-group, users in another sub-group will not be affected by that problem.

The architecture also allows checkpointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can set up a MIPv4 termination and set up a PMIPv6 session towards the core network. A session manager can track the mapping of the sessions and processing to provide the emulation and interworking between the networks. A database can also be used to map information between the sessions, and store, for example, NAI, HoA, and AE information in some embodiments.

The network device allows system resources to be allocated separately for control and data paths. For example, certain PACs/PSCs may be dedicated to performing routing or security control functions while other PACs/PSCs are dedicated to processing user session traffic. As network requirements grow and call models change, hardware resources can be added to accommodate processes, such as encryption, packet filtering, etc., that require more processing power.

Figure 5:
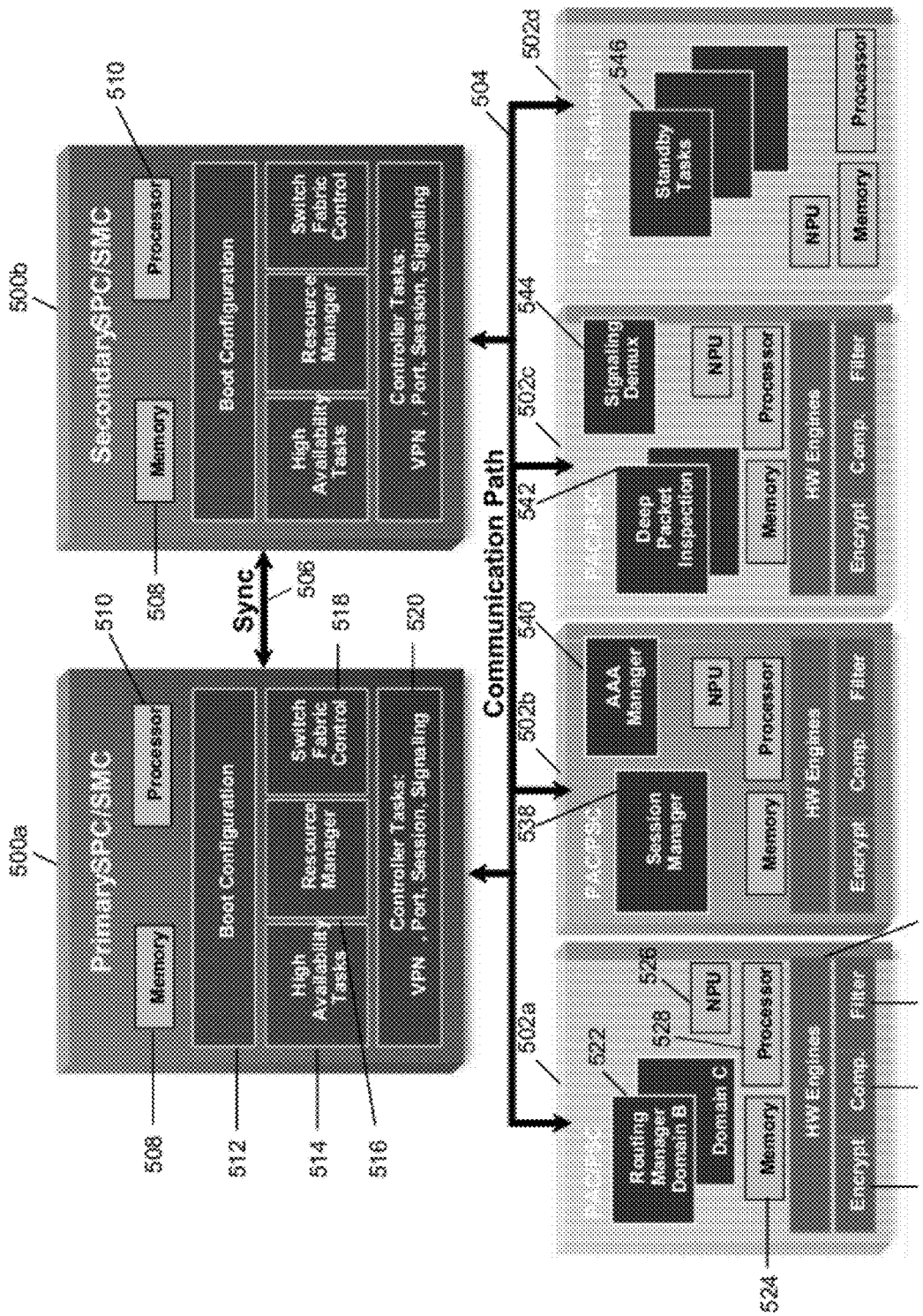

FIG. 5 illustrates a logical view of the software architecture of a network device in accordance with certain embodiments. As shown, the software and hardware can be distributed within the network device and across different circuit boards, processors, and memory. FIG. 5 includes a primary switch processor card (SPC)/system management card (SMC) 500a, a secondary SPC/SMC 500b, PACs/PSCs 502a, 502b, 502c and 502d, a communication path 504, and a synchronization path 506. The SPC/SMC 500 include a memory 508, a processor 510, a boot configuration 512, high availability tasks 514, resource manager 516, switch fabric control 55, and controller tasks 520.

The SPC/SMC 500 manage and control the network device including the other cards in the network device. The SPC/SMC 500 can be configured in a primary and secondary arrangement that provides redundancy and failsafe protection. The modules or tasks running on the SPC/SMC 500 are related to network device-wide control and management. The boot configuration task 512 includes information for starting up and testing the network device. The network device can also be configured to start up in different configurations that provide different implementations. The startup configurations can include specific functionalities and services that are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor-intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide VPN services, assign ports, and create, delete, and modify sessions for user equipment.

The PACs/PSCs 502a, 502b, 502c, 502d are high-speed processing cards that are designed for packet processing and the tasks involved with providing various network functionalities on the network device. The PACs/PSCs include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing for performing certain tasks more efficiently than a general-purpose processor in some embodiments.

Each PAC/PSC 502 is capable of supporting multiple contexts. The PACs/PSCs 502 are also capable of running a variety of tasks or modules. PAC/PSC 502a provides routing managers 522, each handling routing for different domains. PAC/PSC 502b provides a session manager 538 and an AAA manager 540. The session manager 538 manages one or more sessions that correspond to one or more user equipment. A session allows a user equipment to communicate with the network for voice calls and data. The AAA manager 540 manages accounting, authentication, and authorization in conjunction with an AAA server in the network. PAC/PSC 502 may also provide a deep packet inspection task 542 and a signaling demux 544. The deep packet inspection task 542 provides inspection of packet information at layers 4 and higher for use and analysis by the network device. The signaling demux 544 can provide scalability of services in combination with other modules. PAC/PSC 502d provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high-level procedural or object-oriented language such as C, C++, C#, Java, or Perl. The software may also be implemented in assembly language if desired. Packet processing implemented on a network device can include any processing determined by the context. For example, packet processing may involve high-level data link control (HDLC) framing, header compression, and/or encryption. In certain embodiments, the software is stored on a storage medium or device, such as read-only memory (ROM), programmable-read-only memory (PROM), electrically-erasable programmable-read-only memory (EEPROM), flash memory, or a magnetic disk that is readable by a general- or special-purpose processing unit to perform the processes described in this document. The processors can include any microprocessor handling an x86 or other instruction set with one or more cores, system-on-chip (SoC), microcontroller, digital signal processor (DSP), graphics processing unit (GPU), or any other integrated circuit capable of processing instructions.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims that follow. For example, while three ARP priority level ranges are described, an arbitrary number of ARP priority ranges could be used.

We claim:

1. A method comprising:
   receiving a request at a packet gateway in a core network to allocate a new bearer for a mobile device on a wireless telecommunications network;
   determining, at the packet gateway, that resources are not currently available to allocate the new bearer;
   identifying, at the packet gateway, one or more existing bearers that have (i) a bandwidth that can be reduced without dropping the existing bearers, (ii) have a lower priority than the new bearer, and (iii) have previously been designated as capable of being preempted, wherein said identification is based on at least one of source network information, deep packet inspection (DPI), and a device type;
   reducing, at the packet gateway, the bandwidth of the one or more identified existing bearers such that bandwidth is reclaimed and becomes available for use; and
   allocating resources for the new bearer using the reclaimed bandwidth at the packet gateway without causing any of the existing bearers to be disconnected.

2. The method of claim 1, further comprising notifying a management node and a policy control node of the reduction of bandwidth of the existing bearers.

3. The method of claim 1, further comprising identifying the one or more existing bearers from existing bearers with the lowest priority.

4. The method of claim 1, wherein the packet gateway is in a congested or overloaded state.

5. The method of claim 1, wherein the packet gateway determines the bandwidth reduction of the existing bearers using a retention bandwidth, the retention bandwidth based on quality of service (QoS) parameters.

6. The method of claim 5, wherein the QoS parameters include a guaranteed minimum bandwidth requirement (MBR).

7. The method of claim 1, wherein the bandwidth and priority of the existing bearers is provided in an allocation and retention priority (ARP) parameter.

8. The method of claim 1, further comprising using an allocation and retention priority (ARP) preemption capability parameter to determine whether to reduce the bandwidth of existing bearers, and using an ARP preemption vulnerability parameter to determine whether to reduce the bandwidth of a specific existing bearer.

9. The method of claim 1, wherein the bandwidth of the existing bearers is based on a quality of service (QoS) of the existing bearers.

10. The method of claim 1, wherein the packet gateway is an evolved packet core (EPC) PGW, the core network is an EPC network, the new bearer and the existing bearers are EPC bearers, and the wireless telecommunications network is a LTE network utilizing orthogonal frequency division multiple access (OFDMA).

11. A packet gateway comprising:
a processor;
a memory coupled to the processor and configured for storing bearer quality of service (QoS) state information for bearers that have been established at the packet gateway between a packet network and a mobile network, wherein the state information includes at least a bitrate, a priority, a preemption capability, and a preemption vulnerability;
a first network interface for communicating with a mobile node via the mobile network;
a second network interface for communicating with the packet network; and
a bearer management module for receiving a request to allocate a new bearer with a high QoS priority, identifying, using the bearer QoS information in the memory, at least one existing bearer that can be preempted and that can be modified to use a lower bitrate based on at least one of source network information, deep packet inspection (DPI), and a device type, modifying the at least one existing bearer to use a lower bitrate without disconnection, and allocating a new bearer in response to the request to allocate the new bearer.

12. The packet gateway of claim 11, further comprising the bearer management module being configured to reduce resources allocated to at least one existing bearer to a retention bandwidth, wherein the retention bandwidth is the minimum bandwidth required to retain the bearer without dropping the bearer.

13. The packet gateway of claim 11, further comprising the bearer management module being configured to identify the at least one existing bearer by examining the bearers in QoS priority order from lowest to highest.

14. The packet gateway of claim 11, further comprising the bearer management module being configured to identify the at least one existing bearer in a way that minimizes the number of bearers that are modified.

15. The packet gateway of claim 11, wherein the packet gateway is in a congested or overloaded state.

16. The packet gateway of claim 12, wherein the resource that is deallocated from the at least one existing bearer is bandwidth, and wherein the sum of the deallocated bandwidth of all preempted bearers is at least equal to the bandwidth needed to establish the new bearer with the high QoS priority.

17. The packet gateway of claim 11, further comprising the bearer management module being configured to use an allocation and retention priority (ARP) preemption capability parameter to determine whether to reduce the QoS of existing bearers, and an ARP preemption vulnerability parameter to determine whether to reduce the QoS of a specific existing bearer.

18. The packet gateway of claim 11, wherein the bearers are evolved packet core (EPC) bearers, the packet gateway is a PGW, and the mobile network is an EPC network.

19. Logic encoded in one or more non-transient media that includes code for execution and when executed by a processor is operable to perform operations comprising:
receiving a request at a packet gateway (PGW) in an evolved packet core (EPC) network to allocate a new EPC bearer for a mobile device on a wireless telecommunications network;
determining, at the packet gateway, that resources are not currently available to allocate the new bearer;
identifying, at the packet gateway, existing bearers that have a bandwidth that can be reduced without dropping the existing bearers, have a lower priority than the new EPC bearer, and that have previously been designated as capable of being preempted, wherein said identification is based on at least one of source network information, deep packet inspection (DPI), and a device type;
reducing, at the packet gateway, the bandwidth of the identified existing bearers such that the bandwidth is reclaimed and becomes available for use; and
allocating resources for the new bearer using the reclaimed bandwidth at the packet gateway without causing any of the existing bearers to be disconnected.

* * * * *